Figure 1:
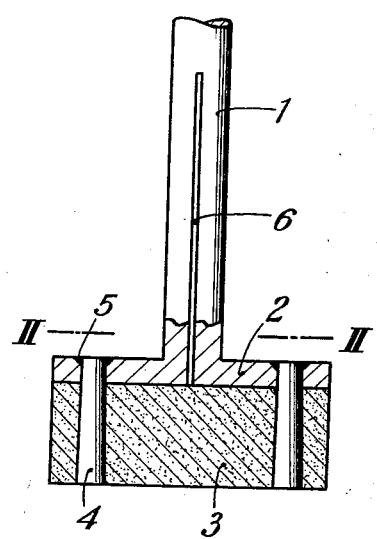

Sept. 21, 1937.  W. DÄLLENBACH  2,093,711
ELECTRODE FOR VACUUM DISCHARGE VESSELS
Filed June 1, 1935

INVENTOR
Walter Dällenbach
BY
ATTORNEYS

Patented Sept. 21, 1937

2,093,711

UNITED STATES PATENT OFFICE 2,093,711

ELECTRODE FOR VACUUM-DISCHARGE VESSELS

Walter Dällenbach, Berlin-Charlottenburg, Germany

Application June 1, 1935, Serial No. 24,575
In Germany June 1, 1934

11 Claims. (Cl. 250—27.5)

My invention relates to electrodes for vacuum-discharge vessels. It is an object of my invention to provide an improved electrode which combines the advantages of a current-supplying conductor made of high-melting metal, such as tungsten, or molybdenum, and of an electrode body made of graphite or carbon; may be used for currents of any desired high intensity, and is comparatively cheap to make.

To this end, I provide, in an electrode for vacuum-discharge vessels, a conductor of high-melting metal, and an electrode body connected to the conductor, and I make one of the members, i. e., either the conductor or the electrode body, elastic.

It is old to make electrodes, and particularly the anodes of vacuum-discharge vessels, such as rectifiers, of carbon or graphite, but it is difficult to connect such electrodes or rather, electrode bodies to the metal conductor which supplies the current.

In vacuum-discharge vessels for small outputs, it is also old to make the current-supplying conductor of high-melting metal, such as tungsten or molybdenum, and to insert one end of the conductor into a corresponding opening of the graphite or carbon electrode body. Under the action of heat, the graphite or the carbon of the electrode sinters together with the high-melting metal, and the connection provides an excellent passage of the current.

Such an electrode is very useful for small outputs but not for high outputs in which thick conductors and electrodes are provided. The coefficient of expansion is not very different in the high-melting metal of the conductor, and in the graphite or carbon of the electrode body, but it has been found that when the electrode is heated, its thick body tends to crack. Another drawback is that the current-supplying conductor, being of valuable metal, is rather expensive.

In a preferred embodiment of an electrode according to my invention, for vacuum-discharge vessels, and particularly for large rectifiers, the current-supplying conductor is, at least at that end which is connected to the electrode body, subdivided into a plurality of spaced individual conductors of high-melting metal which are inserted in the electrode body. The individual conductors which may be pins extending through the conductor and the electrode body, may be arranged to yield, for instance, by supporting them resiliently, or the electrode body and/or a plate at that end of the conductor to which the electrode body is connected, may be subdivided into sectors by radial slots, and each sector of the conductor plate may be supported by not less than one individual conductor.

A particularly suitable embodiment of my invention provides subdividing a plate at the inner end of the conductor into sectors by radial slots which, if desired, extend partly into the body of the conductor, and securing to the individual sectors of the plate, pins of high-melting metal, preferably by welding. This embodiment may be modified by providing the radial slots not in the plate but in the electrode body, and by subdividing the plate and the body in the manner described. It is not necessary that the slots should be radial but they may be arranged in those directions in which cracks are likely to occur. By these means, the individual sectors, or other members, of the conductor or the electrode body become slightly shifted with respect to each other, and the corresponding stresses are equalized without cracking.

The slots may be saw cuts, or they may be obtained by any other suitable means.

In the accompanying drawing, an electrode having a conductor plate subdivided into sectors, and an undivided electrode body, and an electrode having an undivided plate and a body subdivided into sectors, are illustrated by way of example.

In the drawing

Figure 3:
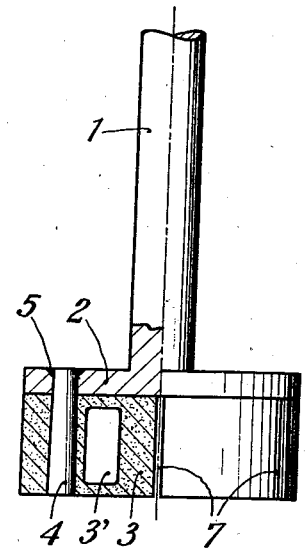
Figure 2:
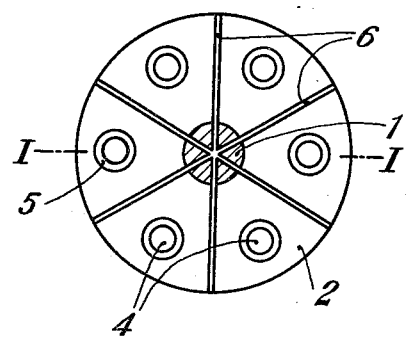
Figure 4:
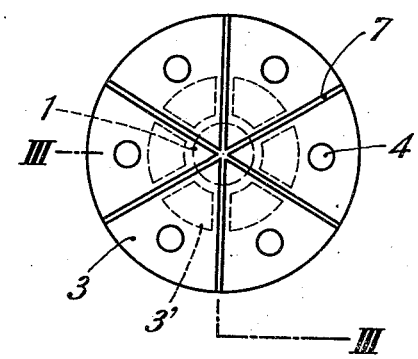

Fig. 1 is an elevation, partly in section on the line I—I of Fig. 2, showing the first type of electrode, Fig. 2 is a plan view of this electrode, the base of its conductor being cut away along the line II—II in Fig. 1, Fig. 3 is partly a section on the line III—III in Fig. 4, and an elevation of, the second type of electrode, and Fig. 4 is a plan view of this type, viewed from below in Fig. 3.

Referring now to the drawing, in all figures 1 is a current-supplying conductor of high-melting metal, and 2 is a circular plate at the lower end of the conductor which may be integral with the conductor 1, or connected thereto by any suitable means, and may consist of iron, steel or iron-chromium alloy. The plate 2 is subdivided into sectors by slots 6 which extend radially as far as the axis of the conductor 1 and are extended axially into the lower portion of the conductor above the plate 2, as shown in Fig. 1. Obviously, it is not necessary that the slots 6 should extend into the conductor 1 at all, or as far as its axis, but the arrangement becomes particularly elastic if the slots are arranged as described.

An undivided electrode body 3, of graphite, carbon, or any other carbonaceous material, is placed on the lower face of plate 2 and held by pins 4. The pins may be of tungsten, molybdenum, or of any other high-melting metal, and are inserted in holes of the plate 2 with welds 5. Preferably, each sector of the plate 2 has a pin 4 of its own, as illustrated, but obviously more than one pin, or no pin at all, may be provided in a given sector.

The subdivision of the plate 2 by the slots 6 which, as described, extend also into the conductor 1, prevents cracking of the electrode body 3 when it is heated, since the slots 6 present space enough for free heat expansion.

Practical tests have shown that in such an electrode in which current is conducted from the conductor 1 to the body 3 through pins 4, cracks are absolutely avoided.

For mercury-vapor rectifiers, the electrode of the first type has the advantage that, if backward ignition occurs, the return current is distributed all over the electrode body 3.

If great mechanical strength of the electrode is desired, the second type, as shown in Figs. 3 and 4, is preferred. The distinction between the first and the second type is that not the plate 2, but the electrode body 3 is subdivided into sectors by radial slots 7, and each sector is supported by a pin 4, as described.

To prevent the electrode body 3 to become loose when heated to a high temperature, the pins 4 are preferably tapered slightly toward the plate 2, as shown in Fig. 3.

Cavities 3' may be formed in the sectors of the divided electrode body, Figs. 3 and 4, or in the undivided electrode body, Figs. 1 and 2, to reduce the weight of the body, and to facilitate the abduction of gases from its sectors, or from its body, as the case may be.

I claim:

1. An electrode for vacuum discharge vessels comprising, a metallic conductor of high melting point consisting of a stem and a flange integral therewith, the latter having a plurality of radially extending slots dividing said flange into a plurality of segments, and a carbonaceous electrode rigidly attached to each of said segments.

2. An elastic electrode for vacuum discharge vessels comprising a radially slotted conductor stem, a flange at one end of said stem having a plurality of radially extending slots aligned with the slots in said stem, a conductor pin consisting of a metal having a high melting point attached to said flange between each two adjacent slots and extending perpendicularly from said flange in a direction opposite from said stem and an electrode body of carbonaceous material engaged by each of said pins.

3. An elastic electrode as claimed in claim 2, said pins being of a high melting metal from the group consisting of tungsten or molybdenum.

4. An electrode for vacuum discharge vessels comprising a conductor stem and a flange integral therewith, a plurality of conductor pins attached to said flange and extending perpendicularly therefrom in a direction opposite from said stem, a carbonaceous electrode body secured to said conductor pins adjacent said flange, said electrode body having at least one slot therein whereby said electrode is expansible relative to said flange.

5. An electrode for vacuum discharge vessels comprising a conductor stem and a flange integral therewith, a plurality of conductor pins attached to said flange and extending perpendicularly therefrom in a direction opposite from said stem, a carbonaceous electrode body secured to said conductor pins adjacent said flange, said electrode body having a plurality of radially extending slots therein whereby said electrode is expansible relative to said flange.

6. An electrode for vacuum discharge vessels comprising a conductor stem and a flange integral therewith, a plurality of conductor pins attached to said flange at equally spaced intervals and a substantially wedge-shaped carbonaceous electrode secured to each conductor pin adjacent said flange, whereby said electrodes and said flange are freely expansible relative to each other.

7. An electrode for vacuum discharge vessels as claimed in claim 6, all of said electrodes converging toward a central point and having their adjacent faces spaced away from each other.

8. An electrode for vacuum discharge vessels comprising a high melting point metal conductor, plate means joined to one end of said conductor, carbonaceous electrode means adjacent said plate means, pins extending through said plate means and electrode means, and slots subdividing one of said means into a plurality of segments adapted to allow for relative expansion between said metal conductor and said electrode means.

9. An electrode for vacuum discharge vessels comprising a metal conductor, a block of carbonaceous material adapted to be an electrode, pins consisting of a high melting point metal joining said block to said conductor, and slots subdividing one of said means into a plurality of segments adapted to allow for relative expansion between said conductor and said block.

10. An electrode as set forth in claim 9, said pin extending through said flange and said block, said pin being tapered toward said flange.

11. An electrode as set forth in claim 9, said block of carbonaceous material having a cavity in the interior thereof.

WALTER DÄLLENBACH.